United States Patent [19]

Pickering et al.

[11] Patent Number: 5,050,194
[45] Date of Patent: Sep. 17, 1991

[54] HIGH SPEED ASYNCHRONOUS DATA INTERFACE

[75] Inventors: Andrew J. Pickering, Rugby; Ian J. Lawrie, Dorset, both of England

[73] Assignees: Plessey Overseas Limited, Ilford; GEC Plessey Telecommunications Ltd, Coventry, both of England

[21] Appl. No.: 493,730

[22] Filed: Mar. 14, 1990

[30] Foreign Application Priority Data

Mar. 30, 1989 [GB] United Kingdom ........... 8907152

[51] Int. Cl.$^5$ ............................................. H04L 7/033
[52] U.S. Cl. ................................... 375/108; 307/516; 375/110
[58] Field of Search .............. 375/20, 87, 108, 110, 375/118, 120; 307/511, 516, 520, 523, 269; 328/56; 331/1 A

[56] References Cited

U.S. PATENT DOCUMENTS

| | | | |
|---|---|---|---|
| 4,592,072 | 5/1986 | Stewart | 375/110 |
| 4,611,335 | 9/1986 | Arai et al. | 375/110 |
| 4,752,942 | 6/1988 | Iwakami | 375/110 |
| 4,805,197 | 2/1989 | Jagt et al. | 375/110 |

*Primary Examiner*—Benedict V. Safourek
*Attorney, Agent, or Firm*—Fleit, Jacobson, Cohn, Price, Holman & Stern

[57] ABSTRACT

A digital data interface for high speed asynchronous data transfer is described. The design is nominally intended for integration onto the component chips in communications systems. The system is described with respect to its realization in CMOS IC technology. The techniques involved, however, may easily be applied to other technologies. The interface employs Manchester Bi-Phase Mark encoding of the clock and data to allow extraction of the clock and data signals at the receiver. Furthermore, use of this Manchester code allows code violations to be easily employed as frame markers for synchronization means. The essence of the clock extraction and data detection circuit is the use of calibrated delay line elements to suppress data transitions within the coded input signal, thus allowing the clock transitions to be detected from which the clock is then generated.

5 Claims, 6 Drawing Sheets

HIGH SPEED ASYNCHRONOUS DATA INTERFACE

The present invention relates to a high speed asynchronous data interface for use in digital communications systems.

The development of modern digital communications systems demands the facility of high-speed transfer of parallel streams of data between boards in a system. This requirement cannot be met by normal synchronous data transmission since a small difference in clock and data propagation delays results in misalignment and hence erroneous clocking. For this reason, an asynchronous technique is needed whereby the clock and data are encoded onto the same signal. The clock may then be extracted from the transmitted signal at the receiver, and used to decode the incoming data and align it with the on-chip clock.

An aim of the present invention is to provide an asynchronous CMOS high-speed chip-to-chip data interface which may be integrated into the component chips of a communications system. The interface is primarily intended for electrical transmission over distances of several meters, although it would also be suitable for longer links implemented with fibre optics.

According to the present invention there is provided a high speed asynchronous data interface comprising at least one interface transmitter and at least one interface receiver, and a transmission line interconnecting the transmitter and receiver, by way of which data is transmitted from the transmitter to the receiver, wherein each receiver includes a data encoder and data clock extraction circuit which are connected to a data alignment circuit arranged to generate output data, characterised in that the data clock extraction circuit comprises a latch which receives, from a transient detector, a set pulse at an input, for each transient state of the data, and causes an output of the latch to adopt a low logic level, the output is coupled to a delay line which propagates the low level and generates a reset pulse which resets the latch, restoring a high logic level at the output of the latch, wherein, any data dependent transient pulse generated while the latch is reset is overridden at this time and the clock is extracted from the output of the latch.

An embodiment of the present invention will now be described with reference to the accompanying drawings wherein.

Figure 1:
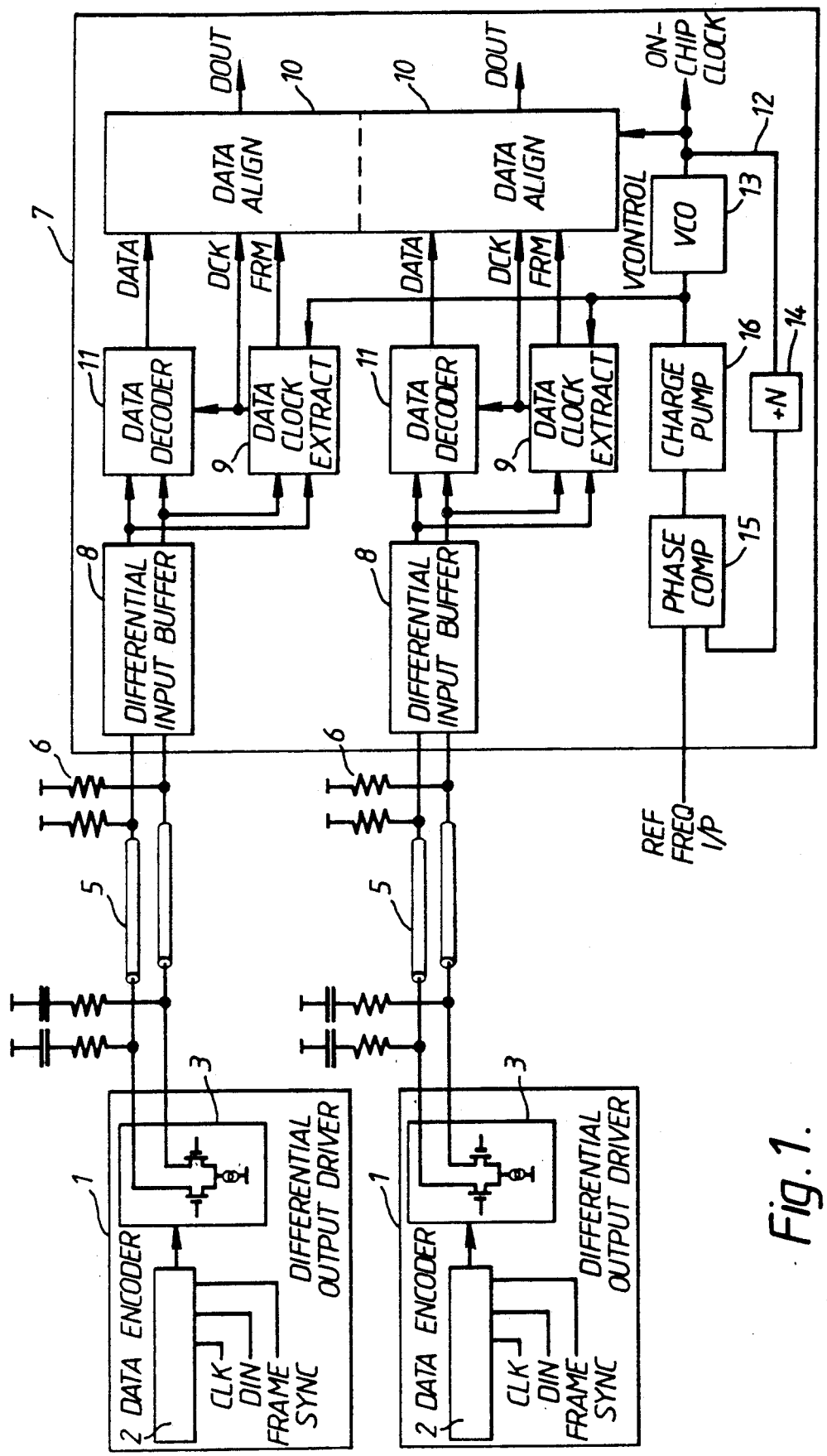
FIG. 1 shows a block diagram of a high speed asynchronous data interface.

Referring to FIG. 1, the interface is intended to be used for operation at data rates up to several hundred Mbit/s using a 1 um CMOS technology. The data is Manchester encoded at the transmitter to allow extraction of the data clock from the received signal DIN. This eliminates the problems of clock skew which would otherwise be a problem at this data rate. The extracted clock is used to sample and decode the input signal and clock the data into the alignment circuitry.

A phase-locked loop (PLL) is employed to calibrate the clock extraction circuitry to the data transmission rate supplied by an external frequency reference. The PLL output may be used for the on-chip clock to avoid the need to distribute a high frequency system clock.

Data is transmitted as packets to allow alignment of parallel streams of data and the packet frame marker is realised by the deliberate generation of a Manchester code violation (i.e. the omission of a clock transient) in the data stream.

The off-chip data is transmitted as a differential signal to minimise the effects of common-mode noise, and matching of the transmission line is performed to minimise problems of noise caused by reflections. Matched terminations should preferably be used to absorb reflections at both ends of the transmission link. However, by only terminating the line at the receiver, the signal swing may be doubled and so this may be a preferred configuration. The input and output buffers are implemented using standard CMOS technology.

Figure 2:
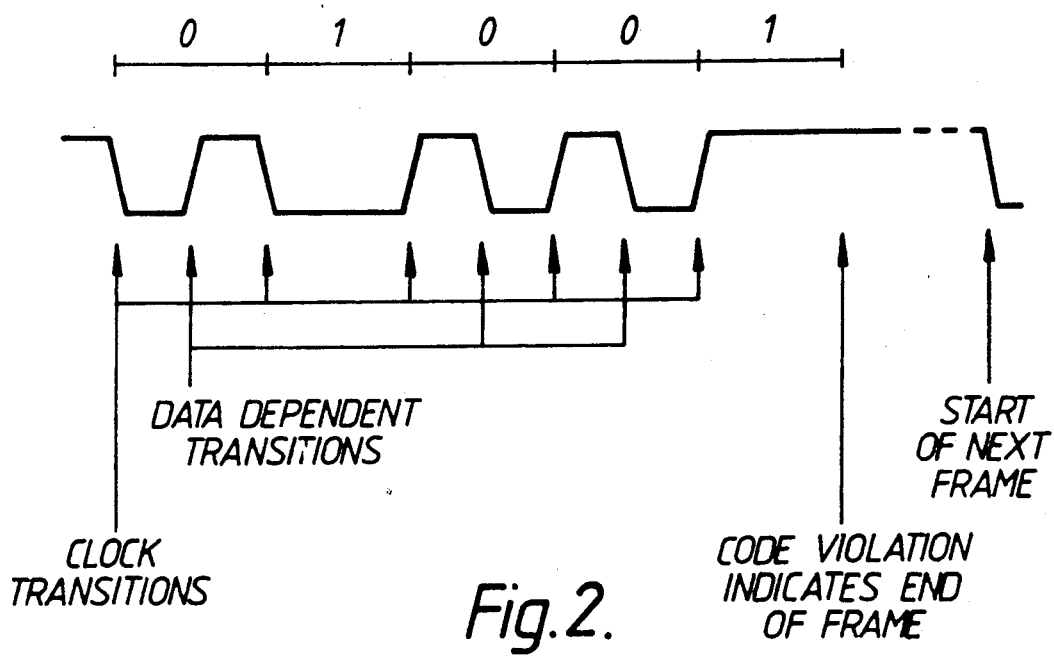
FIG. 2 shows the data format for the interface.

To eliminate the problem of clock skew, Manchester Bi-Phase Mark encoding has been employed. With this code a clock transient is guaranteed to occur at the edge of every bit cell boundary as shown in FIG. 2 with a data-dependent transition occurring in the middle of the bit period. The clock and data transients may therefore be extracted separately at the receiver to reconstruct the clock and data signals.

Also, a frame marker can be implemented by deliberately generating a code violation. This is done by omitting the clock transient at the end of the frame. This marker is then detected and used to align the data packets from different inputs.

The data transmission circuitry simply consists of an encoder 2 to generate the Manchester code output signal from the binary data, and generate the code violation as the frame end marker. The encoded signal is then driven off-chip through the output buffer 3.

The encoder 2 also receives a clock signal and a frame sync signal. The output stage of the output driver is a differential current-driven buffer 3 implemented in full CMOS and has only current sinking capability. The current is sourced by the transmission line matching impedances 6 situated at the receiver end of the link 5. This saves chip area in the output driver and also means that if the power supply fails at the receiver, the transmitter does not drive any current into the receiver input which could otherwise cause component damage.

A current sink of 10 mA in the output driver will give a 250 mV differential signal swing assuming a 50 ohm line impedance with matched termination impedances at each end (500 mV for a 100 ohm line).

The transmission link is terminated at both ends with matched impedances 6 to minimise reflections of the data signal. Echoes at the receiver will interfere with the main signal and reduce the noise margin. The termination impedance at the receiver is connected to the positive power supply rail and provides the source current for the output driver. The termination at the transmitter is AC coupled to the supply to prevent DC current flowing as a result of supply level differences between transmitter and receiver. This also means that no DC current is sourced by the transmitter board thus reducing the possibility of component damage in the event of a power supply failure at the receiver end.

At the receiver 7, the incoming signal is first amplified to full CMOS logic levels by the differential input amplifier 8. The clock data and frame marker are then extracted from the encoded signal by circuit 9. The extracted clock is subsequently used to clock the data into the frame alignment block 10. The data is decoded by circuit 11. A phase locked loop 12 comprises a voltage controlled oscillator 13, divider chain 14, and phase comparator 15 and a charge pump circuit 16.

The method for extracting the clock signal from the Manchester encoded data input is based on a calibrated analogue delay line technique described by Borriello et al in U.S. Pat. No. 4,513,427 and is shown in FIG. 3.

Figure 3:
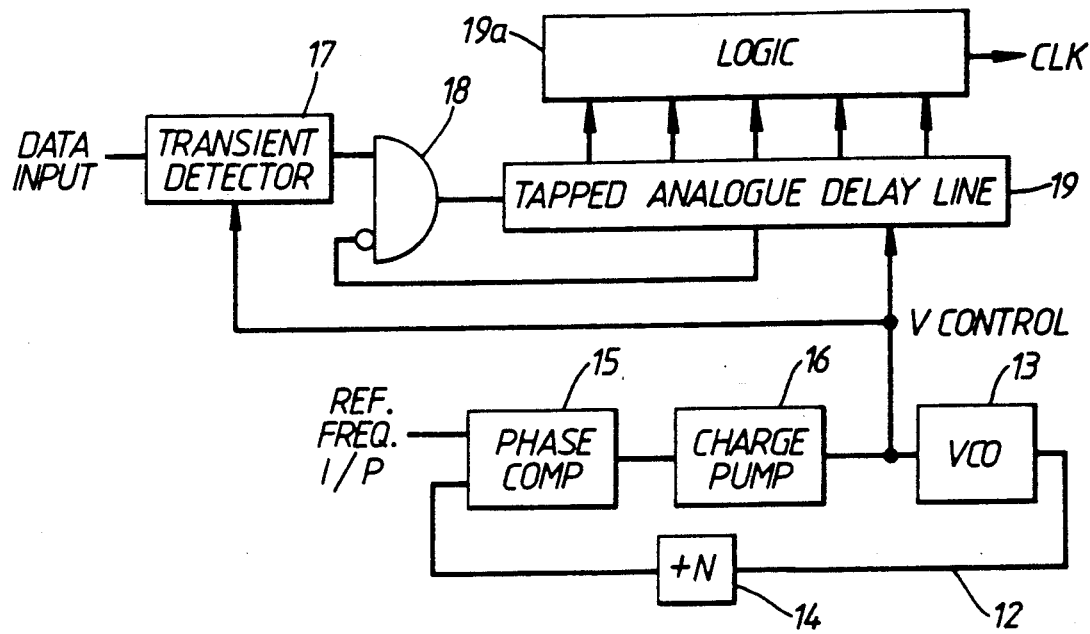
FIG. 3 shows a block diagram of a known clock extraction circuit.

Referring to FIG. 3, a phase-locked loop 12 containing a ring oscillator 13 made up a voltage-controlled delay elements is synchronised to a reference clock running at the data bit frequency. This therefore calibrates the propagation delay of each stage to a proportional fraction of the data cycle period. A delay line made up of these delay elements is used to generate pulses (nominally of a quarter bit period) which are then passed through a transient detector 17 and a masking gate 18 and propagated down a second analogue delay line 19. Taps off of this delay line are then used to generate a masking control signal such that only clock edge generated pulses are passed through to the delay line, the data dependent pulses being masked. The signal propagating down the second analogue delay line 19 can therefore be used to regenerate the data clock from logic circuit 19a. This system, however, was designed for operation at 10 Mbit/s bit rate (albeit on a 4 um CMOS technology) and has several shortcomings which forfeit its viability for operation at higher data rates:

Firstly, the circuit operation relies on a pulse propagating down an analogue delay line containing many delay elements. To maintain the integrity of the pulse width, the delay time of each stage must be small compared to the pulse width. If the pulse width is reduced (as is obviously required for high speed operation) the delay elements do not have time to traverse a full logic swing and this causes fluctuations in the propagation delay.

Secondly, for operation at 160 Mbit/s the number of stages in the delay line has to be reduced thus reducing the resolution of the delay line and making generation of an accurate masking control pulse impossible.

Also, the above system requires the generation of an accurate width clock transient pulse (using the first delay line) which is subsequently used to generate the masking pulse. This means that the masking pulse width and the extracted clock signal vary with the propagating delay variation of the first delay line.

Figure 4:
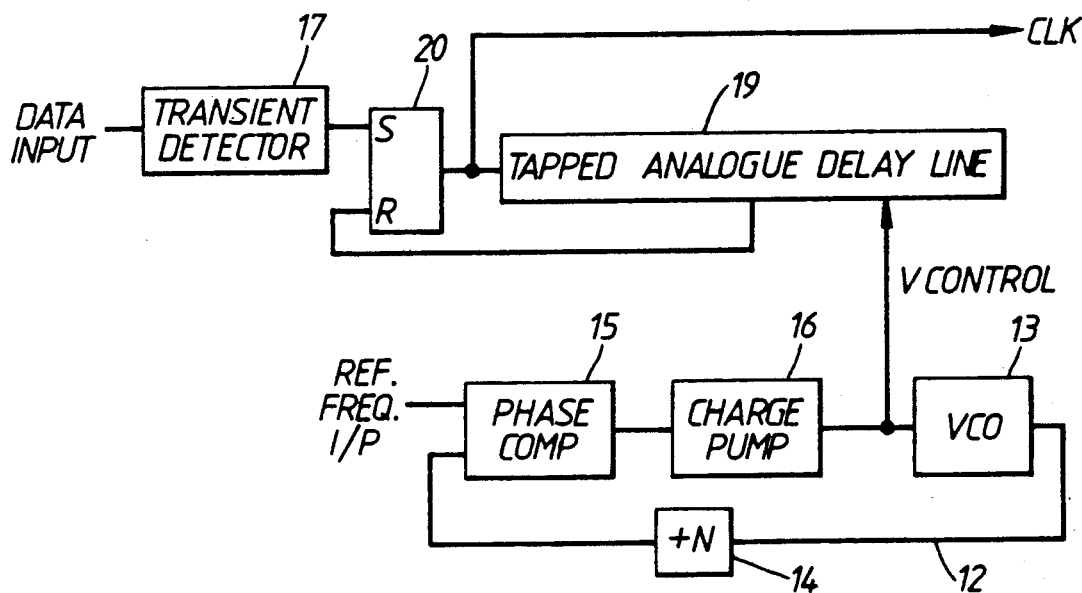
FIG. 4 shows a block diagram of an improved clock extraction circuit.

For operation at 160 Mbit/s data rate this scheme has therefore been modified as shown in FIG. 4, and includes an SR latch 20. Although closely resembling the original scheme proposed by Borriello et al., the operating mechanism of this circuit is very different and is particularly suitable for high speed operation. The details and signal waveforms for the new circuit are shown in FIG. 5.

Figure 5:
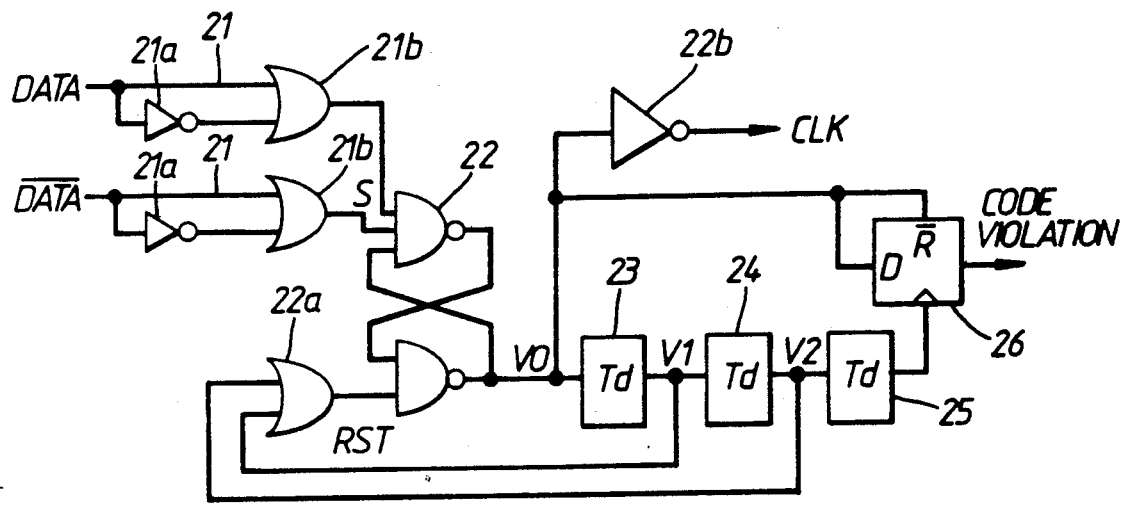
FIG. 5 shows a circuit diagram of part of the block diagram shown in FIG. 4, and the signal waveforms.
Figure 5:
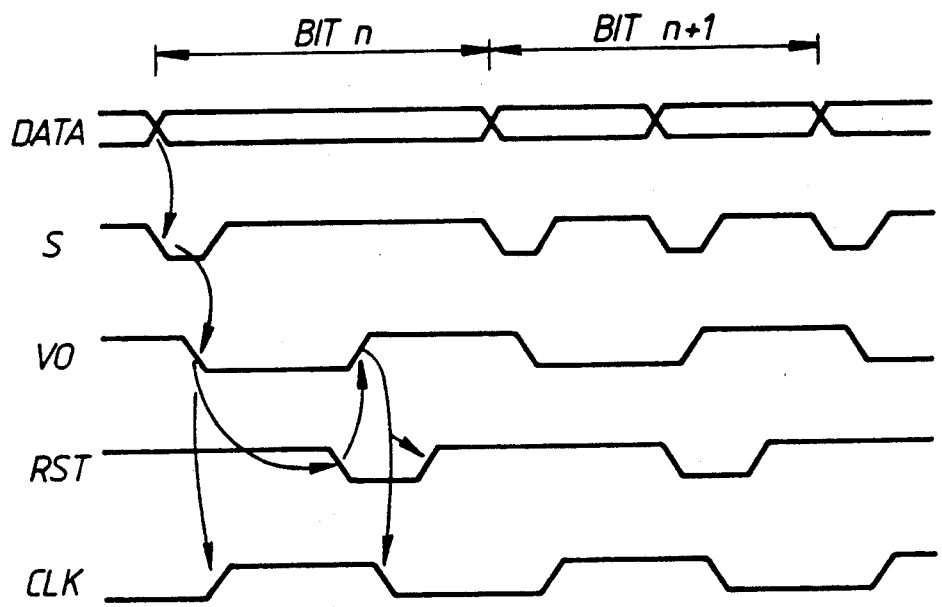

Referring to FIG. 5, true and inverse data signals from the differential CMOS input stage 18 are applied to a pair of negative edge-triggered monostables 21 made up of an inverter 21a and an OR-gate 21b. This generates a set pulse, S, at the latch 22 for each transient of the data signal. The set pulse flips the latch 22 to give a low logic level at V0. This low level propagates through two delay stages 23, 24 with a nominal delay per stage, Td, of one quarter bit period and then generates a reset pulse, RST, generated from OR-gate 22a which resets the latch thus restoring a high logic level at V0. The reset pulse endures for a quarter bit period and holds the latch 22 in a reset state during this time. Any data-dependent transient pulse generated during the middle of the bit period will be overridden by the reset pulse and thus masked out.

The extracted clock is then simply taken from the output of the latch 22, by way of an inverter 22b.

The code violation detection is achieved by means of a third delay stage 25 in the delay line which samples the state of the latch 22 during the next bit cycle. If the latch output, V0, has not yet been triggered by the next clock transient and is still high, a code violation is indicated at the output of a further latch 26.

Since this circuit relies on the propagation of a single logic level transient down the delay line, rather than a pulse, the operating speed can be made much higher than the previous design. Also, the width of the pulses generated by the data input transients does not affect the timing of the reset pulse and hence the extracted clock signal.

The extracted clock is subsequently used to sample and decode the input data signal.

Figure 6:
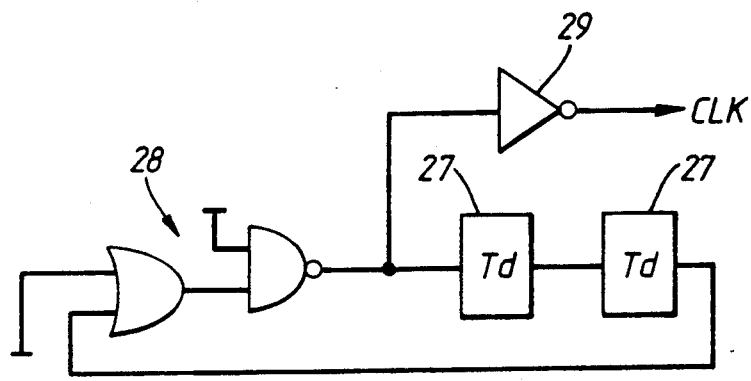
FIG. 6 shows a block diagram of a voltage controlled oscillator.

The nominal delay of each buffer stage in the clock extraction circuit is a quarter of the bit period. In practice, however, the propagation delay through the masking logic and latch retards the reset pulse causing the clock output pulse to be extended. For optimum operation the clock output should have unity mark/space ratio and so the stage delay should be slightly reduced to compensate for the latch propagation delay. This can be achieved by the replication of the masking logic delay in the voltage-controlled ring oscillator as shown in FIG. 6. When the VCO is locked to the reference frequency the total ring delay will be equal to half the bit period, and this will be equal to the extracted clock pulse width. The VCO comprises a loop consisting of delay stages 27 and gating logic 28. The clock signal is extracted from the inverter 29.

Figure 7:
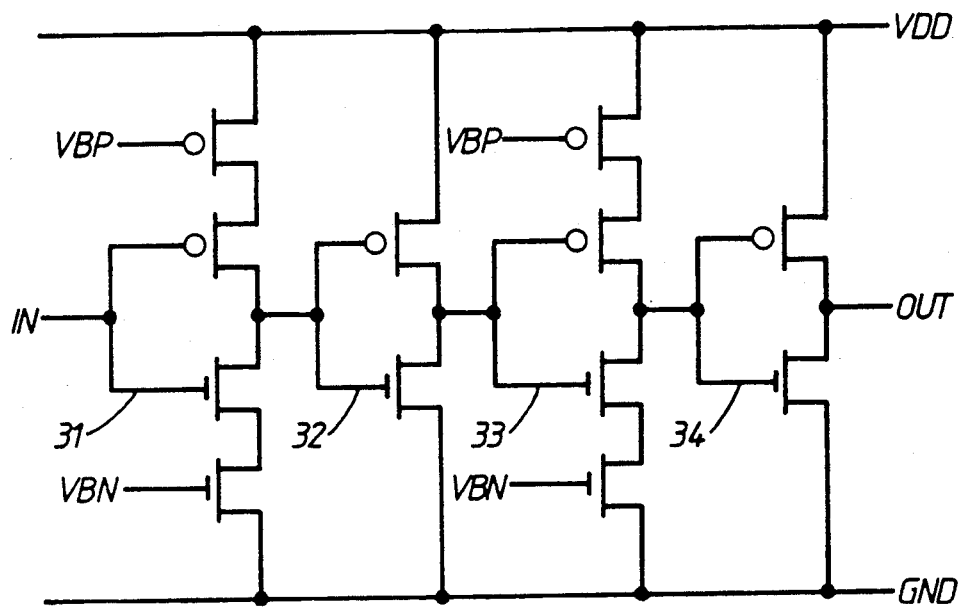
FIG. 7 shows a delay buffer for the oscillator shown in FIG. 6.

The design of the VCO delay state is shown in FIG. 7 and consists of four cascaded inversion stages 31, 32, 33 and 34, two of which are 31 and 33 voltage-controlled by the bias voltages VBN and VBP. These biases are generated using a current mirror to ensure equal charging and discharging currents through the stage and hence equal rise and fall times.

Figure 8:
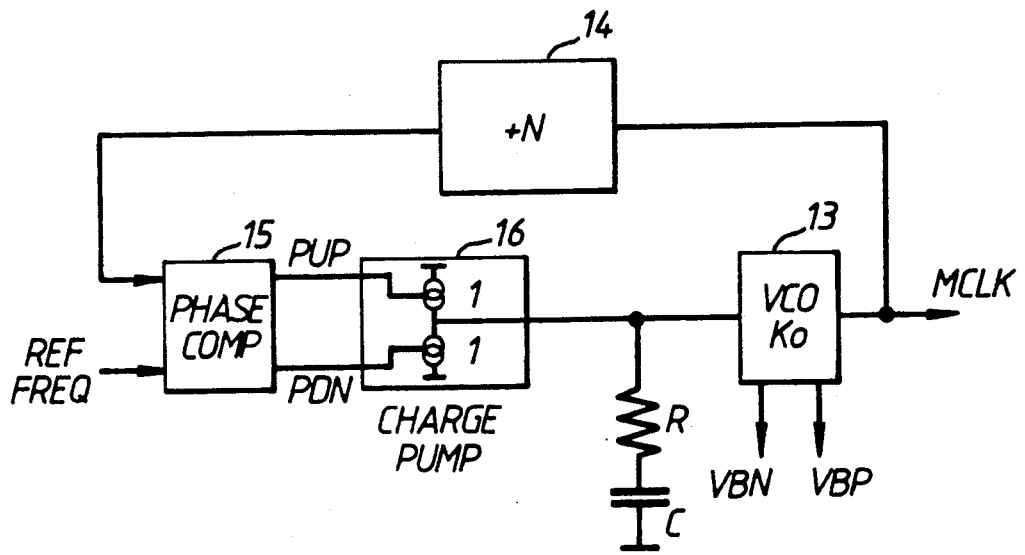
FIG. 8 shows a block diagram of a phase-locked loop, and, FIG. 9 shows a block diagram of a data aligner.

The PLL is standard charge-pump phase-locked loop as shown in FIG. 8. The PLL transient response and stability are simply determined from the values and R and C in the loop filter, and the charge pump current, I. Since the purpose of the loop is just to regenerate the system clock for the chip, and provide the control biases for the voltage-controlled delay elements, the tracking response of the loop is non-critical. The external reference clock may be supplied either at the data frequency (with N=1) or at a sub-multiple of this frequency with suitable frequency division in the feedback loop. This may be exploited to avoid the need to distribute the high frequency clock around the system.

The PLL comprises phase comparator 15 for comparing a reference frequency with that generated by the divider chain 14. The comparator 15 drives a charge pump circuit 16 which feeds the VCO 13. The output of the VCO 13 is fed back via the divider chain 14 to the comparator 15.

Figure 9:
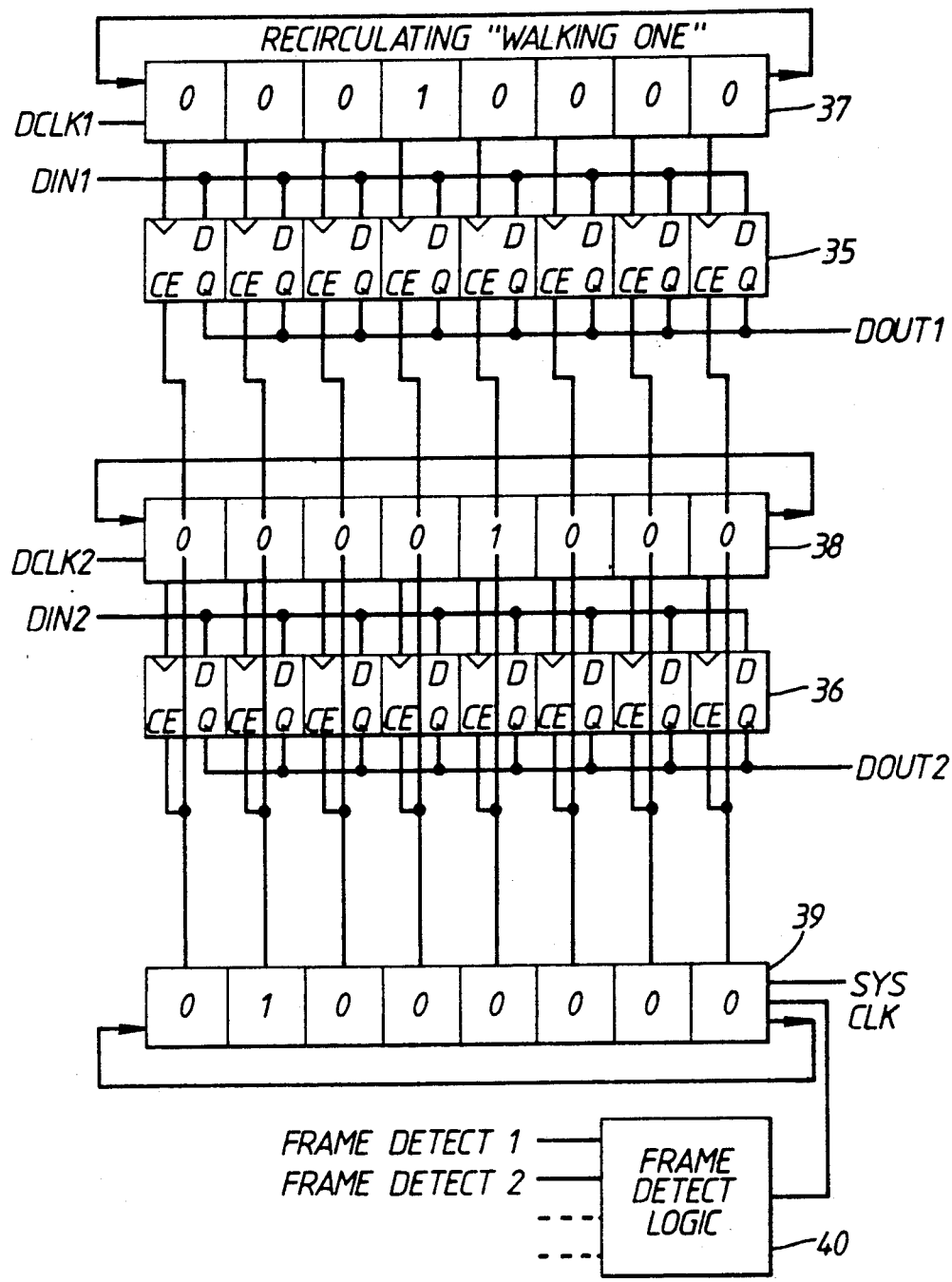

Having extracted the clock and decoded the data from the input signal, the binary data packets need to be aligned and synchronised to the system clock. This is achieved using the arrangement shown in FIG. 9. For each input stream there is a set of latches used to store the input data bits. For each set of latches 35, 36 a shift register arranged as a walking-one sequencer 37, 38 is used to control writing to the data latches. The write control shift register is clocked by the extracted data clock for that input. Another walking-one sequencer 39 common to each input, implements a read control shift register and is clocked by the system clock SYS. When the frame start is detected by circuit 40 on the data input the write control shift register 37, 38 is enabled and the ensuing data clock cycles write the input data sequentially into the latch array. When frame start markers have been detected on all the inputs, the read control shift register 39 is enabled and the system clock then reads the stored data sequentially from the latches on every input line. The length of the latch array and shift registers determine the number of bits which can be held and hence the amount of which the data stream can be aligned.

The above description has been one of embodiment of the invention. It will be appreciated by those skilled in the art that alternative arrangements are possible which will fall within the scope and spirit of the present invention. For example, the invention is realised in CMOS technology, however it can easily be applied to other technologies.

We claim:

1. A high speed asynchronous data interface comprising at least one interface transmitter and at least one interface receiver, and a transmission line interconnecting the transmitter and receiver, by way of which data is transmitted from the transmitter to the receiver, wherein each receiver includes a data decoder and data clock extraction circuit which are connected to a data alignment circuit arranged to generate output data, characterized in that the data clock extraction circuit comprises a delay line, a latch and a transient detector, the latch receiving from the transient detector a set pulse at an input for each transient state of the data, and causing an output of the latch to adopt a low logic level, the output of the latch is coupled to the delay line which propagates the low level and generates a reset pulse which resets the latch and restores a high logic level at the output of the latch, wherein, any data dependent transient pulse generated while the latch is reset is overridden at this time and the clock is extracted from the output of the latch.

2. A high speed asynchronous data interface as claimed in claim 1, wherein the delay line is controllable and comprises two stages, and a further third stage of the delay line is provided for sampling the state of the latch during a subsequent bit cycle, and wherein there is provided a second latch to which said third stage is connected, which second latch receives the output from the first latch, and if the output from the first latch has not been triggered by a succeeding clock transient and is still high, a code violation is indicated by the output of the second latch.

3. A high speed asynchronous data interface as claimed in claim 2, wherein the transient detector comprises two negative edge-triggered monostables each comprising an inverter and an OR-gate.

4. A high speed asynchronous data interface as claimed in claim 3, wherein the clock extraction circuit is connected to a phase-locked loop circuit which generates a control signal for the delay line.

5. A high speed asynchronous data interface as claimed in claim 4, wherein the phase-locked loop circuit includes a voltage controlled oscillator which generates the control signal in synchronism with the clock.

* * * * *